United States Patent
Schultz

(10) Patent No.: US 7,023,252 B2
(45) Date of Patent: Apr. 4, 2006

(54) CHIP LEVEL CLOCK TREE DESKEW CIRCUIT

(75) Inventor: Richard Schultz, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 94 days.

(21) Appl. No.: 10/848,979

(22) Filed: May 19, 2004

(65) Prior Publication Data

US 2005/0258881 A1    Nov. 24, 2005

(51) Int. Cl.
*H03L 7/00* (2006.01)
*G06F 1/04* (2006.01)

(52) U.S. Cl. .................. 327/161; 327/156; 327/295

(58) Field of Classification Search ............ None
See application file for complete search history.

(56) References Cited

U.S. PATENT DOCUMENTS

| | | | | |
|---|---|---|---|---|
| 4,868,522 A | * | 9/1989 | Popat et al. | 331/2 |
| 5,101,117 A | * | 3/1992 | Johnson et al. | 327/149 |
| 5,329,254 A | * | 7/1994 | Takano | 331/34 |
| 5,465,347 A | * | 11/1995 | Chao et al. | 713/401 |
| 5,687,202 A | * | 11/1997 | Eitrheim | 375/376 |
| 5,880,612 A | * | 3/1999 | Kim | 327/158 |
| 6,075,832 A | * | 6/2000 | Geannopoulos et al. | 375/375 |
| 6,271,697 B1 | * | 8/2001 | Hayashi et al. | 327/158 |
| 6,340,905 B1 | | 1/2002 | Schultz | 327/161 |
| 6,429,714 B1 | | 8/2002 | Schultz | 327/291 |
| 6,433,598 B1 | | 8/2002 | Schultz | 327/161 |
| 6,538,957 B1 | * | 3/2003 | Magoshi | 365/233 |
| 6,630,855 B1 | * | 10/2003 | Fayneh et al. | 327/295 |
| 6,653,883 B1 | | 11/2003 | Schultz | 327/291 |
| 6,861,884 B1 | * | 3/2005 | Nguyen et al. | 327/155 |

OTHER PUBLICATIONS

J. Wood, T. Edwards and S. Lipa, "Rotary Traveling-Wave Oscillator Arrays: A New Clock Technology", Nov. 2001, vol. 36., No. 11, pps. 1654-1665.

* cited by examiner

*Primary Examiner*—Tuan T. Lam
(74) *Attorney, Agent, or Firm*—Westman, Champlin & Kelly, P.A.

(57) ABSTRACT

A signal deskew circuit is provided, which includes first and second signal branches, each branch extending between a start location and a respective end location. Each signal branch includes a send path and a return path, which have substantially the same propagation delays. An adjustable delay buffer is coupled in the send and return paths of a first of the signal branches and has a delay, which is adjustable based on a respective adjust signal. A skew sensor coupled to the return paths of the first and second signal branches, which generates the respective adjust signal for the adjustable delay buffer based on a phase difference between signals on the return paths of the first and second signal branches.

19 Claims, 10 Drawing Sheets

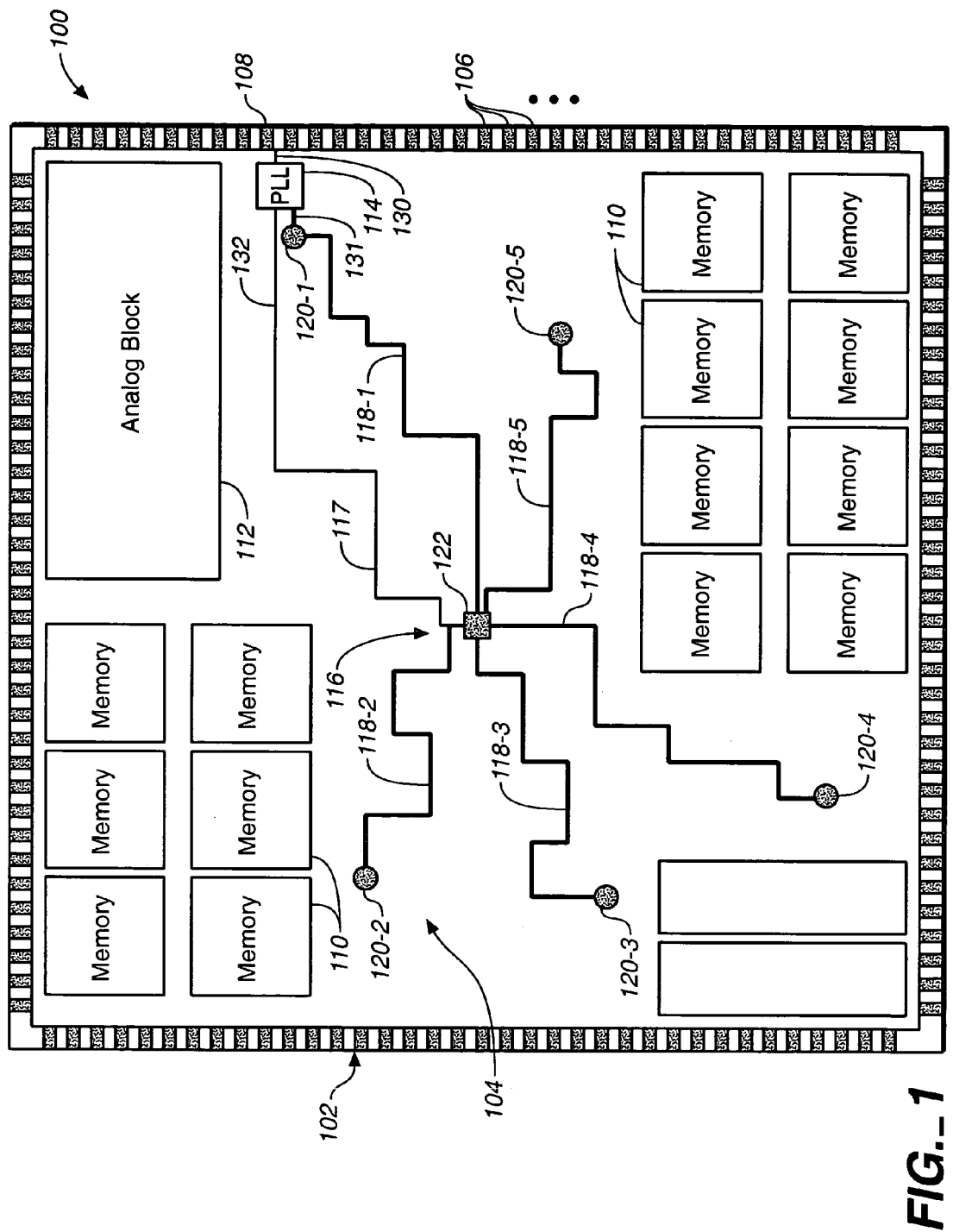
FIG._1

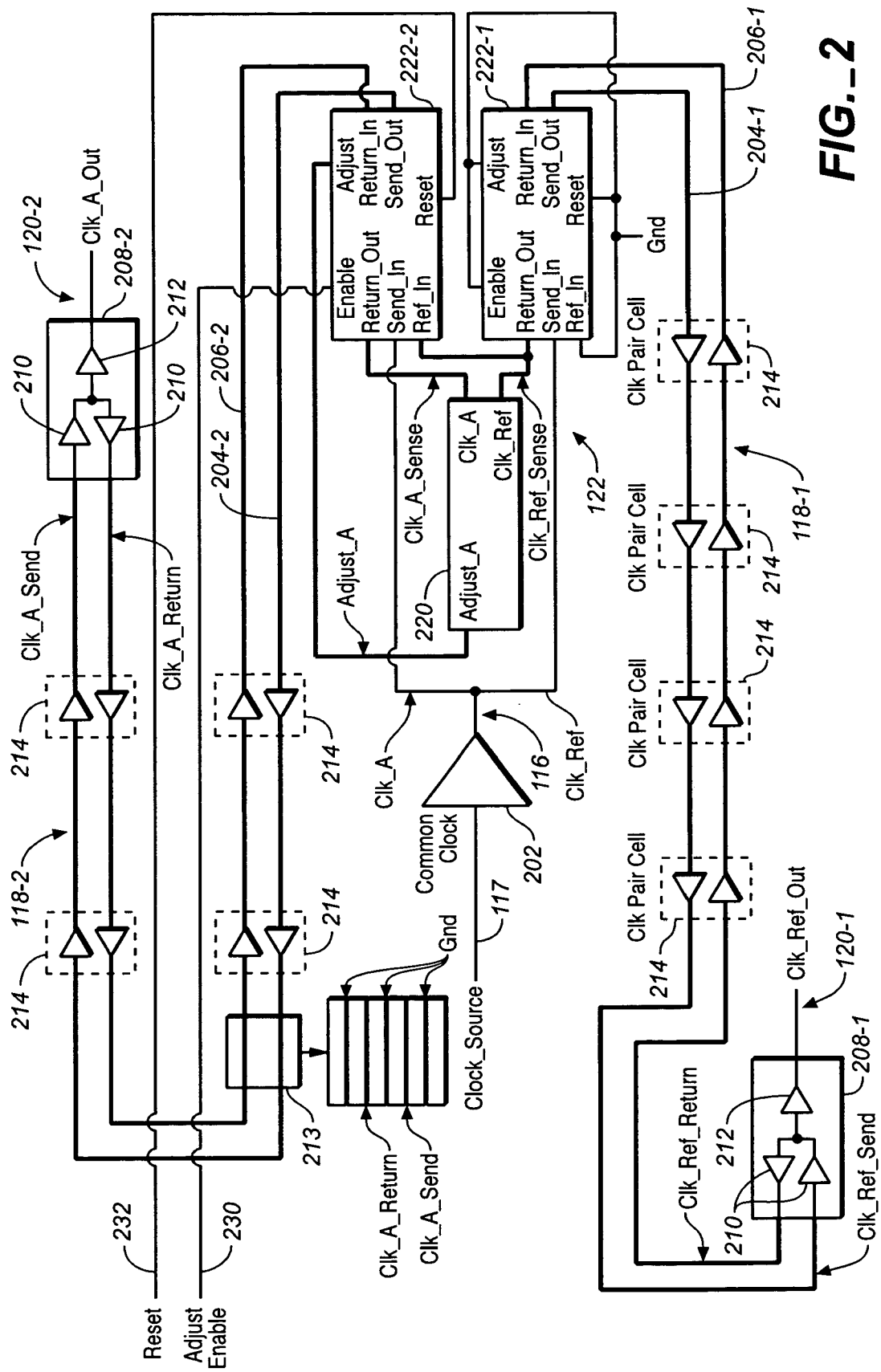
FIG._2

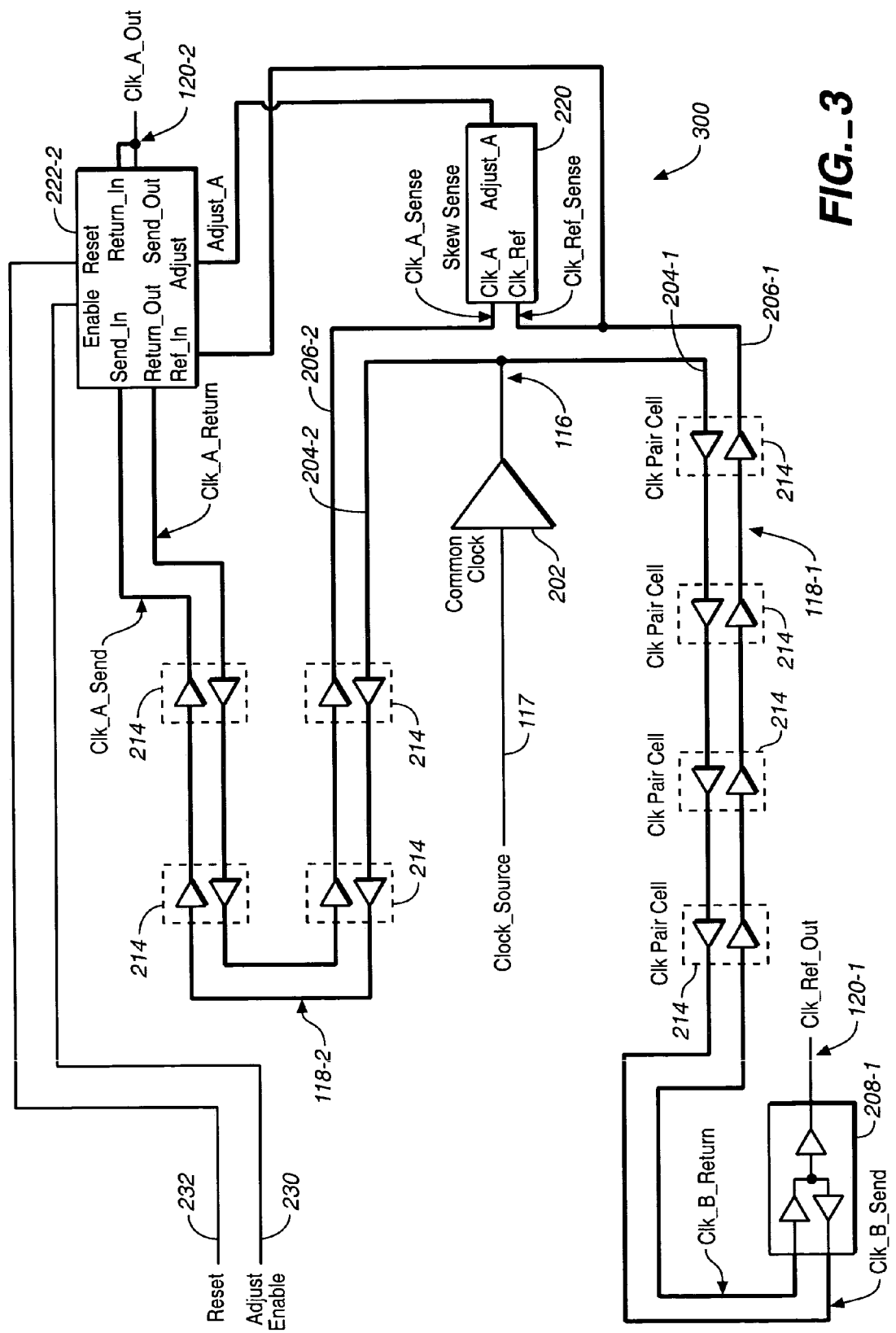
FIG._3

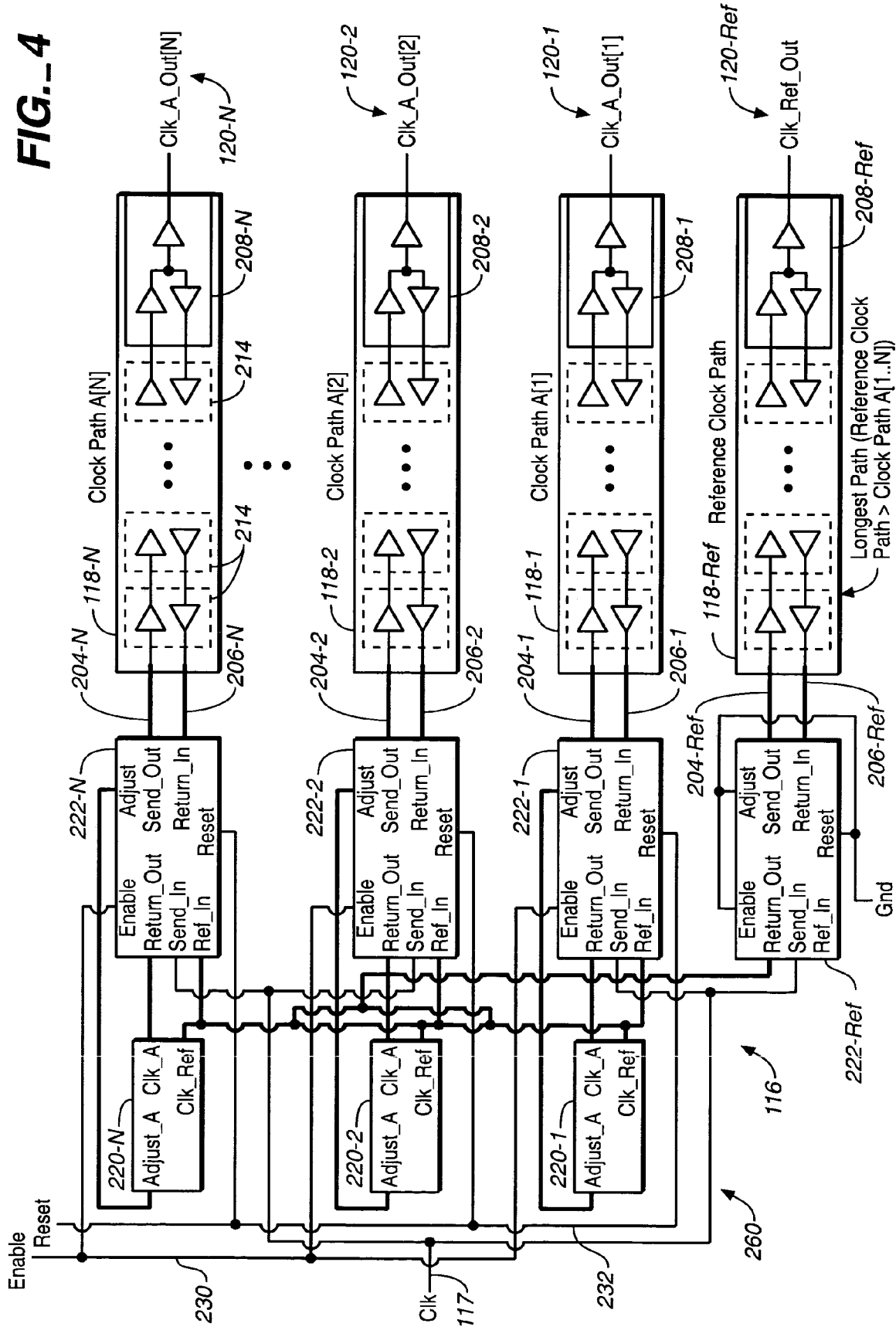
FIG._4

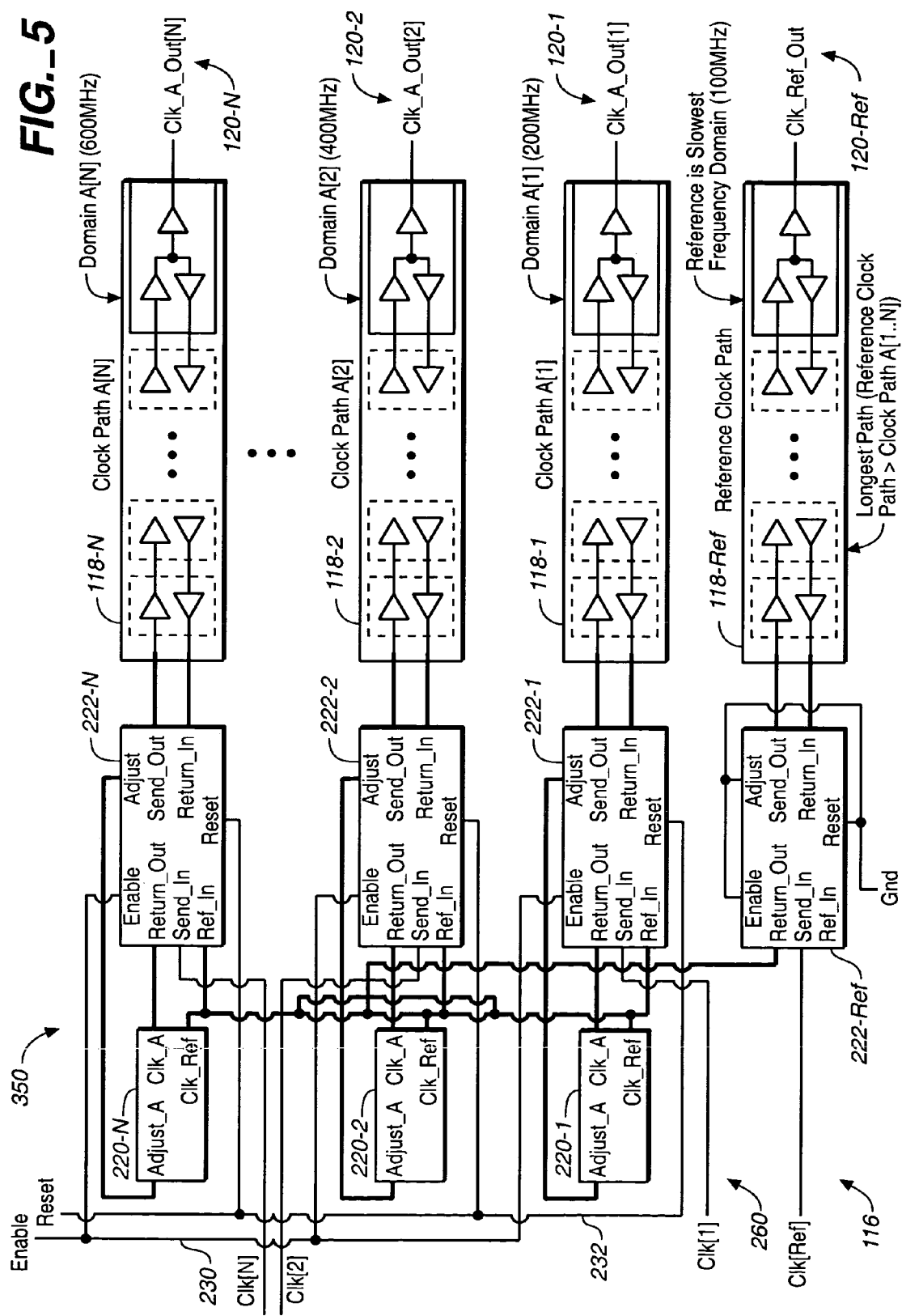
FIG._5

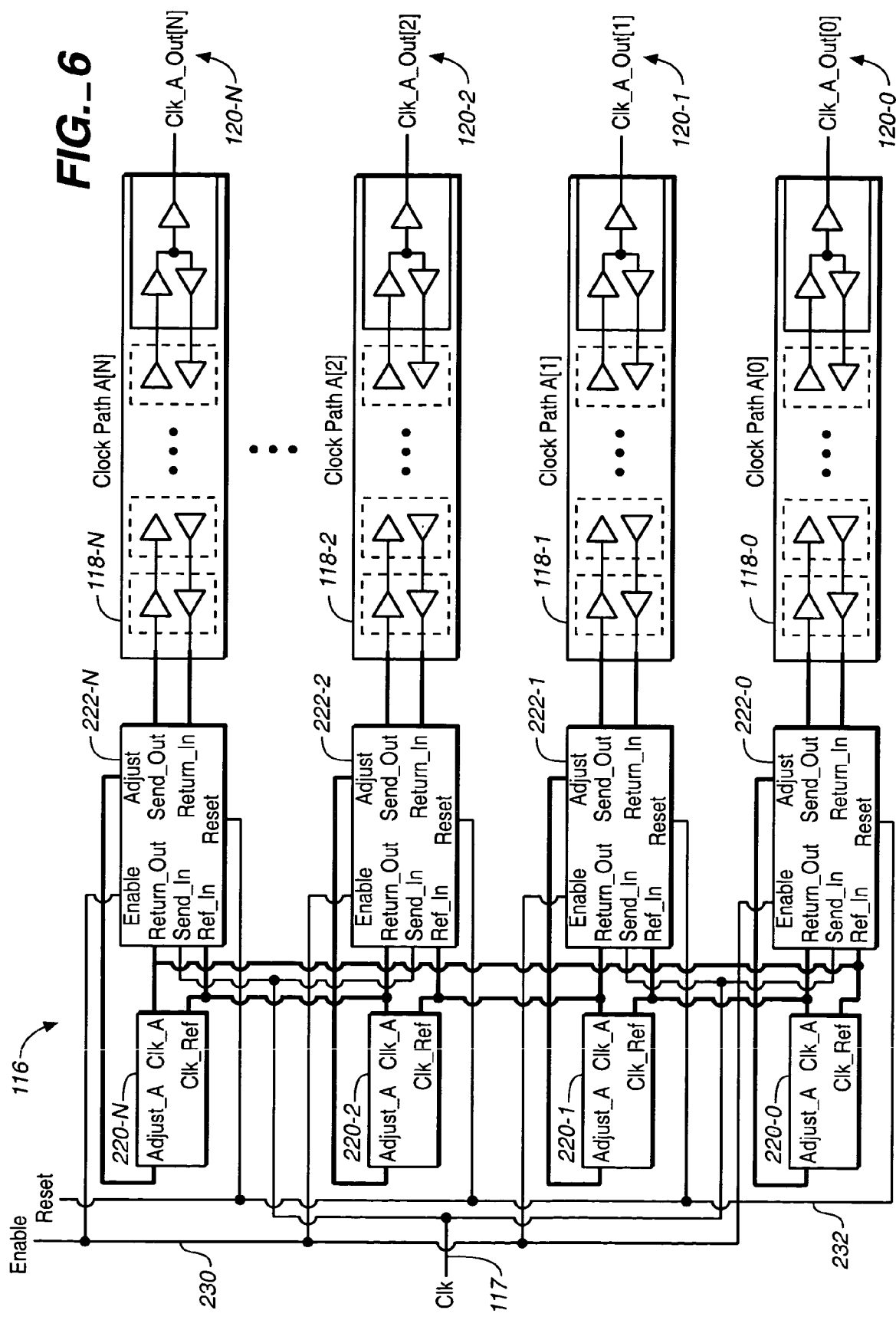
FIG._6

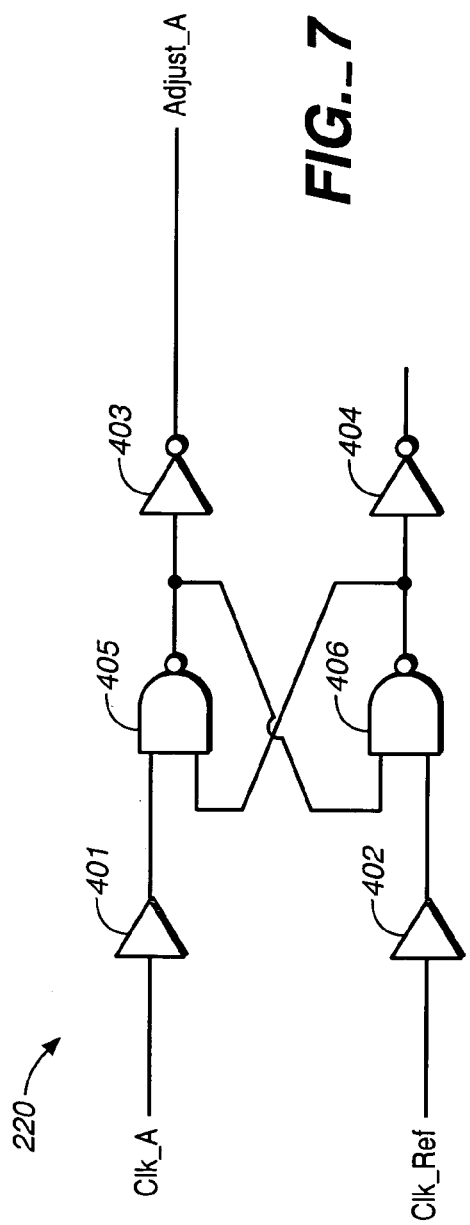
FIG._7
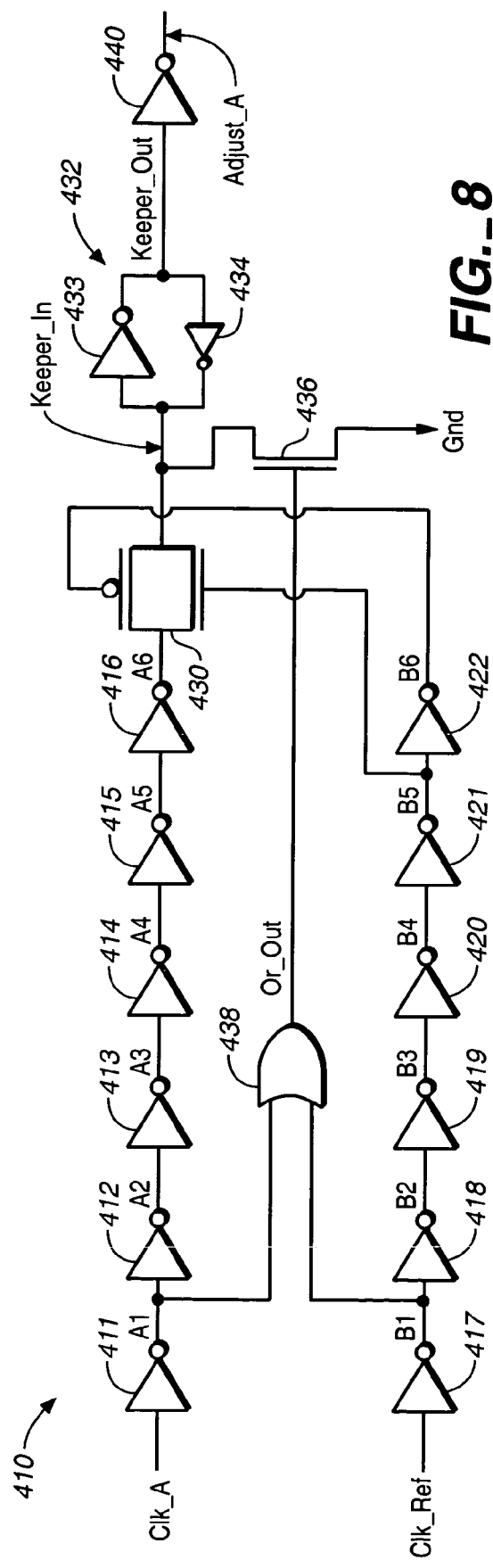
FIG._8

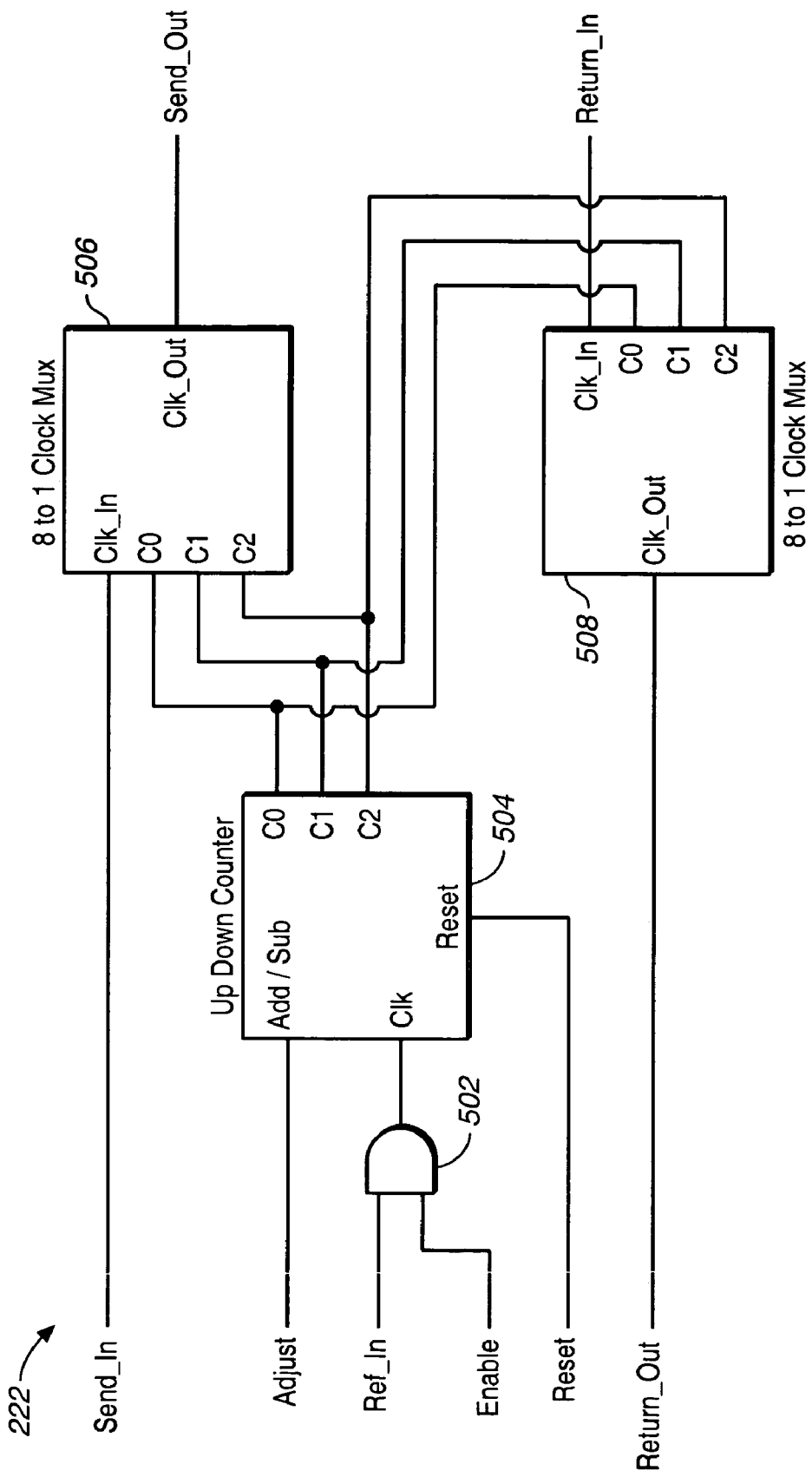
FIG._9

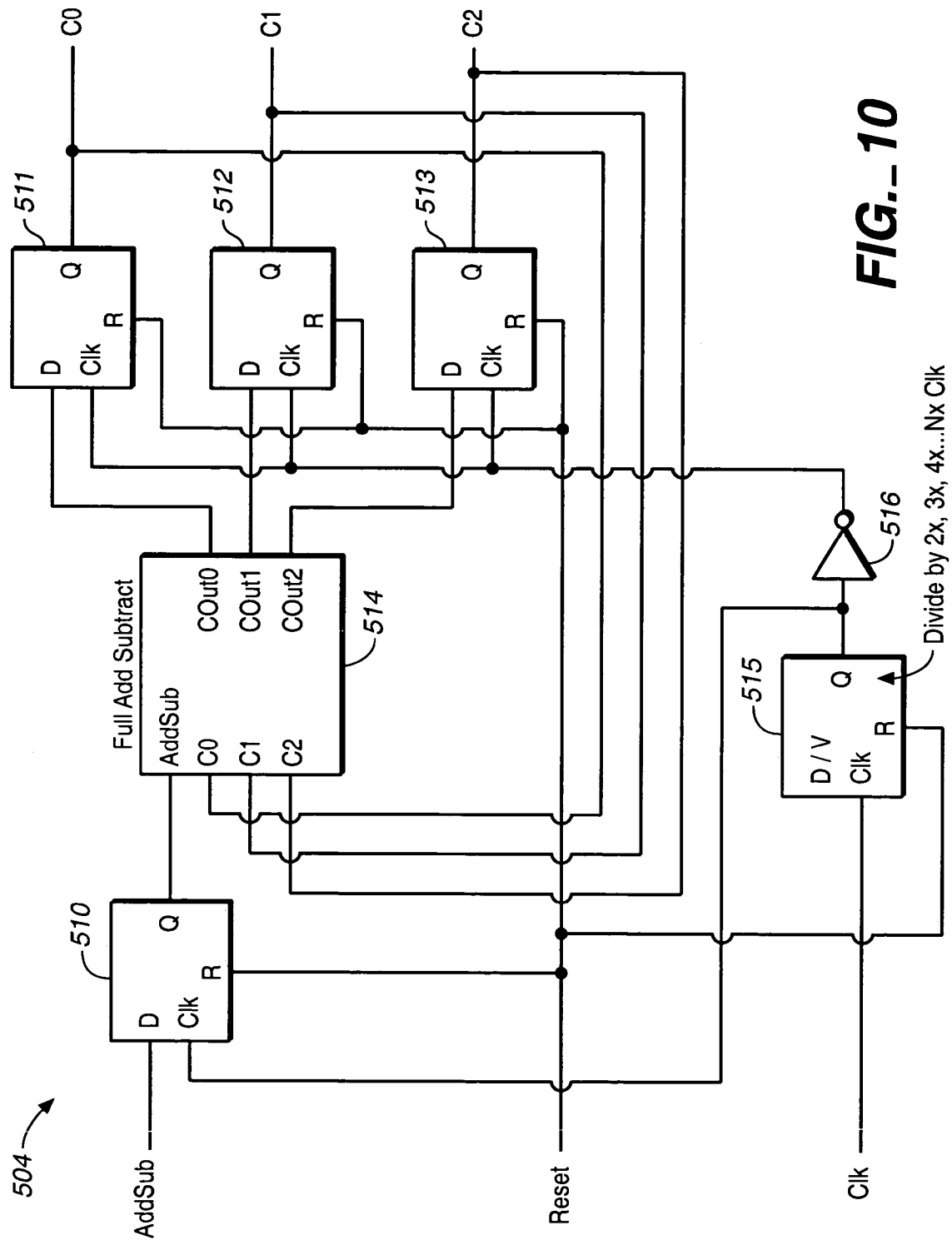
FIG._10

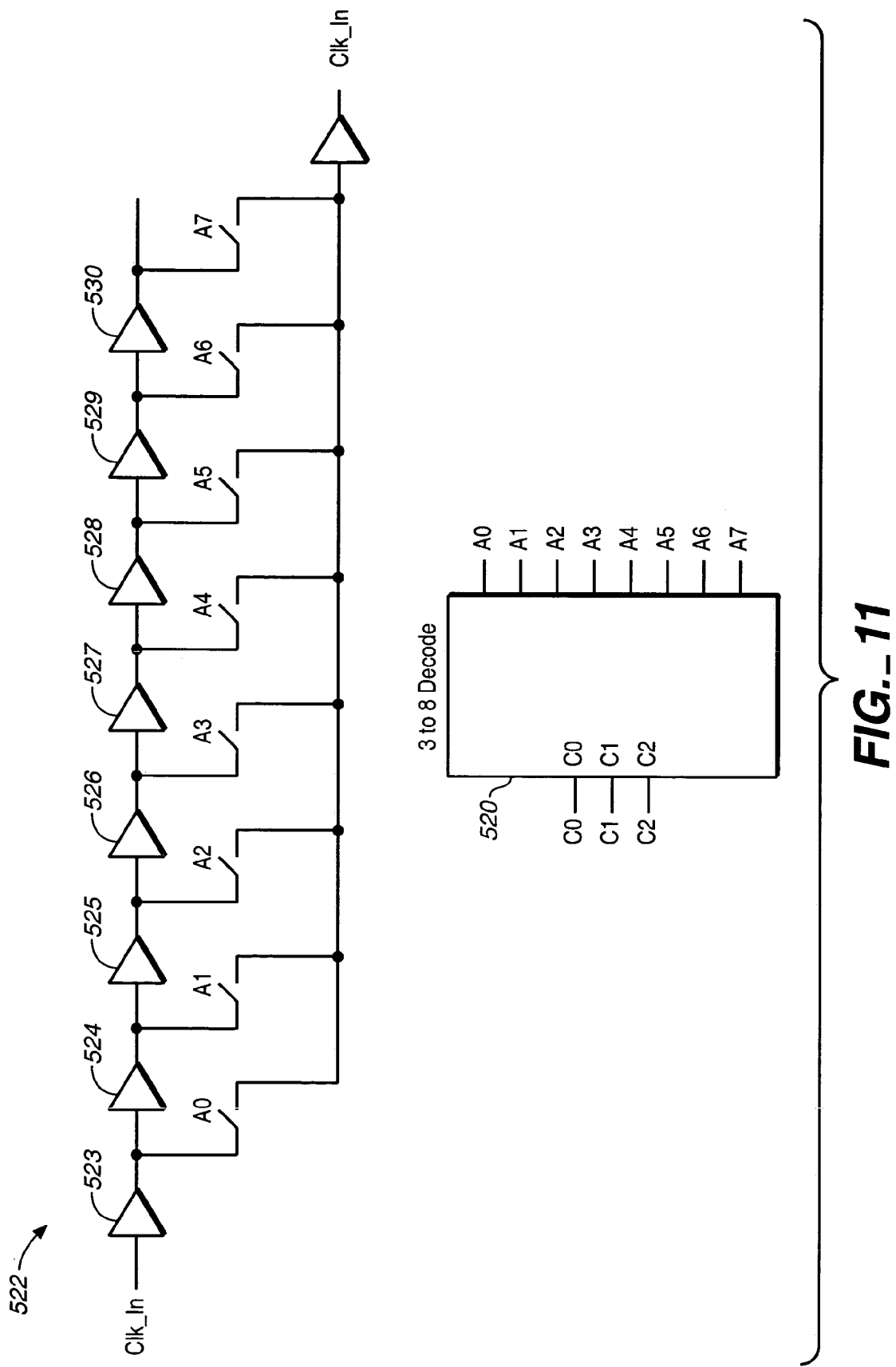
FIG._11

CHIP LEVEL CLOCK TREE DESKEW CIRCUIT

FIELD OF THE INVENTION

The present invention relates to semiconductor integrated circuits and, more particularly to a real time, chip-level clock tree deskew circuit.

BACKGROUND OF THE INVENTION

Integrated circuits typically use one or more clock signals to synchronize components and functions of the integrated circuit. Clock "trees" are used to branch these clock signals through buffers from a common source to components located in various areas on the integrated circuit. For example, a given source clock signal may feed into three buffers to produce three clock signals at a second branch level, which may feed into three more buffers to produce nine clock signals at a third branch level. The clock signals at any level can be used for clocking associated synchronous components and thereby coordinating the functions within the integrated circuit. It is therefore important that the clock signals at any particular level have a predefined phase relationship to one another.

For various reasons, however, any two clock signals at the same level of the same clock tree may be slightly out of phase with one another or do not otherwise have the desired phase relationship. This phase difference between clock signals is called "clock skew." Clock skew can have several causes. For example, the buffers between levels in the clock tree typically introduce a delay between their inputs and outputs, so clock signals at different levels in the clock tree are naturally skewed from each other. Additionally, the load experienced by one clock signal may introduce a delay into the clock signal net that is different from the delay along another clock signal net. Also, routing differences between clock signal nets can result in differences in different resistances between the routes and therefore different propagation delays along the routes. Furthermore, changes in temperature, different applied voltages and tolerances in semiconductor fabrication processes can affect clock skew.

Occasionally, the skew between two clock signals is introduced intentionally to precisely coordinate the operation of two components in the integrated circuits. In any case, the skew must be tightly controlled for the integrated circuit to operate at desired high operating clock frequencies, where all or a portion of the synchronous components of the integrated circuit must switch states simultaneously or synchronously.

Common integrated circuit fabrication techniques try to minimize clock tree skew by resizing buffers in the clock tree to advance or delay transitions of the clock signals or by adding redundant loads to the circuits to balance the loading of the clock tree. Both of these techniques alter the delay of some clock signals relative to other clock signals by specified amounts that are determined by analysis of the timing of the clock signals. However, temperature changes, differences in applied voltages, differences in silicon fabrication processes and inadequate tolerances in the silicon fabrication processes can cause the actual clock skew to vary significantly from the nominal value, even with the above techniques. Improved clock tree deskew methodologies are therefore desired to achieve higher performance out of existing and future integrated circuit technologies.

SUMMARY OF THE INVENTION

One embodiment of the present invention is directed to a signal deskew circuit, which includes first and second signal branches, an adjustable delay buffer and a skew sensor. Each branch extends between a start location and a respective end location and includes a send path and a return path. The send and return paths of each branch have substantially the same propagation delays. The adjustable delay buffer is coupled in the send and return paths of a first of the signal branches and has a delay, which is adjustable based on a respective adjust signal. The skew sensor is coupled to the return paths of the first and second signal branches and generates the adjust signal based on a phase difference between signals on the return paths of the first and second signal branches.

Another embodiment is directed to a method of adjusting phase differences on an integrated circuit. The method includes: (a) passing periodic signals along a plurality of signal branches, which extend between a start location and respective end locations on the integrated circuit and have a send path and a return path that have substantially the same propagation delays; (b) sensing a phase difference between the periodic signals along the return paths of a first and a second of the signal branches; and (c) adjusting a propagation delay along the send path and a propagation delay along the return path of the first signal branch based on the phase difference.

Another embodiment is directed to a signal deskew circuit, which includes first and second signal branches, an adjustable delay buffer circuit and a skew sensor circuit. Each of the signal branches extends between a common start location and a respective end location and has a send path and a return path that have substantially the same propagation delays. The adjustable delay buffer circuit inserts a delay in the send and return paths of the first signal branch, which is adjustable based on an adjust signal. The skew sensor circuit generates the adjust signal based on a phase difference between signals on the return paths of the first and second signal branches.

BRIEF DESCRIPTION OF THE DRAWINGS

FIG. 1 is a diagram of a layout of an integrated circuit according to one embodiment of the present invention.

FIG. 2 is a schematic diagram illustrating a clock branches and a clock deskew circuit in the layout of FIG. 1 in greater detail, according to one embodiment of the present invention.

FIG. 3 is a schematic diagram illustrating a clock deskew circuit according to an alternative embodiment of the present invention.

FIG. 4 is a diagram illustrating the adjustment of a plurality of clock branches in the same clock domain relative to a common reference clock branch.

FIG. 5 is a diagram illustrating adjustment of a plurality of clock branches in different clock domains.

FIG. 6 is a diagram illustrating the adjustment of a plurality of clock branches in a closed-loop neural network.

FIG. 7 is a schematic diagram of one of a skew sensor in the deskew circuits shown in the above figures, according to one embodiment of the present invention.

FIG. 8 is a schematic diagram illustrating a skew sensor according to an alternative embodiment of the present invention.

FIG. 9 is a schematic diagram illustrating a programmable delay buffer in the deskew circuits shown in the above figures, according to one embodiment of the present invention.

FIG. 10 is a schematic diagram illustrating an up/down counter in the programmable delay buffer, according to one embodiment of the present invention.

FIG. 11 is a schematic diagram illustrating a delay multiplexer in the programmable delay buffer, according to one embodiment of the present invention.

DETAILED DESCRIPTION OF ILLUSTRATIVE EMBODIMENTS

FIG. 1 is a diagram, which schematically illustrates a layout of an integrated circuit 100 according to one embodiment of the present invention. Integrated circuit 100 includes an input-output (I/O) region 102 and a core region 104. In this embodiment, I/O region 102 extends along the periphery of integrated circuit 100 and surrounds core region 104. However, I/O region 102 can be located in or along other areas of integrated circuit 100 or can be dispersed over a number of different areas in alternative embodiments of the present invention.

I/O region 102 includes I/O pads 106 for passing signals between core region 104 and devices that are external to integrated circuit 100. For example, I/O pads 106 can include a clock input 108 for receiving an external clock signal.

Core region 104 includes a plurality of semiconductor devices for implementing a desired function. In this example, core region 104 includes a plurality of embedded memory devices 110, an analog block 112 and other circuits (non specifically shown). Many of these circuits include synchronous components that coordinate the functions of integrated circuit 100. These components are synchronized by one or more clock signals that are distributed throughout core region 104. These clock signals can be cased or derived from the external clock signal received on I/O pad 108 or can be generated within integrated circuit 100.

FIG. 1 illustrates an example of a "clock tree" for branching one of these clock signals through a series of buffers to form a plurality of clock signals that are routed to various areas in core region 104. In this example, the external clock signal received on I/O pad 108 is passed through a phase-locked loop (PLL) 114 to a branch start location 116. The signal route from PLL 114 forms a clock source 117 from which a plurality of clock signal branches 118-1 through 118-5 are routed to respective branch end locations 120-1 through 120-5. Although five branches 120 are shown in FIG. 1, integrated circuit 100 can have any number of clock signal branches in any number of clock tree levels in alternative embodiments of the present invention.

As described in more detail below, integrated circuit 100 includes a clock deskew circuit 122 at branch start location 116 for adjusting delays in branches 118 such that the phases of the resulting clock signals at end locations 120 are substantially aligned with one another. Start location 116 can be positioned at any location or area on integrated circuit 100. Deskew circuit 122 includes one or more skew detectors and one or more programmable delay buffers that are adjusted by the skew detectors.

After the deskew operation, the synchronized clock signals at end locations 120-1 through 120-5 can be used to synchronize elements within the localized regions proximate to the end locations. In addition, further levels of balanced clock trees can be used to further distribute these clock signals within each localized region. If desired, additional deskew circuits can be used to balance the clock signal branches within each clock tree level. These deskew circuits can have the same structure and method of operation as one another or can have different structures or methods of operation.

PLL 114 can be used not only to synchronize the on-chip source clock to the phase and frequency of the external clock, but also to minimize the insertion delay at end locations 120 caused by insertion of the deskew circuit 122 and/or the buffers along branches 118. PLL is located in the localized area at end location 120-1. PLL 114 has a reference input 130 coupled to external clock input 108, a feedback input 131 coupled to end location 120-1 and a clock output 132, which provides the source clock for branches 118. PLL 114 adjusts the phase of clock output 132 such that the phase of the feedback input 131 (the branch clock signal at end location 120-1) is aligned with the phase of the external clock signal received on reference input 130. Since PLL 114 is located at one of the end locations, such as end location 120-1, it uses one of the delayed branch clock signals as its feedback input. PLL 114 therefore aligns the delayed branch clock signal to the phase of the external clock signal, thereby removing the insertion delay. The phases of the branch clock signals at all other end locations 120-2 through 120-5 will follow the phase of the branch clock signal at end location 120-1 since clock output from PLL 114 is common to all branches 118. Deskew circuit 122 is therefore capable of providing real time, chip-level, clock tree deskew functionality with near zero insertion delay.

FIG. 2 is a schematic diagram illustrating the clock branches and the clock deskew circuit in greater detail, according to one embodiment of the present invention. For simplicity, FIG. 2 illustrates the balancing of two clock branches, 118-1 and 118-2. This circuit can be expanded as shown in FIG. 4 below for balancing a plurality of clock signal branches. The same reference numerals are used in FIG. 2 as were used in FIG. 1 for the same or similar elements.

Each clock branch has a send path and a return path. For example, branch 118-1 includes a send path 204-1 and a return path 206-1, which extend between start location 116 and end location 120-1. Similarly, branch 118-2 includes a send path 204-2 and a return path 206-2, which extend between start location 116 and end location 120-2.

Clock branch 118-1 further includes a clock endpoint buffer 208-1, which drives a clock output CLK_REF_OUT from send path 204-1 and feeds the clock signal back to return path 206-1. Clock output CLK_REF_OUT can be used for synchronizing elements within the localized region proximate to end location 120-1 or for driving further clock trees within the localized region.

Similarly, clock branch 118-2 includes a clock endpoint buffer 208-2, which drives a clock output CLK_A_OUT from send path 204-2 and feeds the clock signal back to return path 206-2. Clock output CLK_A_OUT can be used for synchronizing elements within the localized region proximate to end location 120-2 or for driving further clock trees within the localized region.

The send and return paths within a particular clock branch are matched to have substantially the same propagation delays between start location 116 and the respective end location 120. Therefore, a clock signal traveling from start location 116 to an end location 120 and then back to the start location 116 would therefore have a propagation delay of approximately two times the delay from the start location to the end location.

In order to match delays, endpoint buffers 208-1 and 208-2 have the same propagation delays for the send and return paths. In this example, endpoint buffers 208-1 and 208-2 include a pair of matched buffers 210, one in each path, and an output buffer 212. Any other buffer structure can be used in alternative embodiments of the present invention. However, the delays through the send and return paths are preferably matched with one another.

Although only one line is shown for each send path 204 and return path 206, these paths include appropriate signal and ground conductors. For example, area 213 illustrates signal conductors CLK_A_SEND and CLK_A_RETURN and ground conductors GND being routed along clock branch 118-2. Each branch 118-1 and 118-2 may be divided into a plurality of segments by one or more matched clock buffers 214. Each clock buffer 214 includes a pair of buffers, one in the send path and one in the return path, which can be implemented as a single semiconductor cell such that the propagation delays in each buffer can be closely matched. Also, the routing delays within each segment of send path is matched with the routing delays of the corresponding segment of the return path in that branch in terms of resistance and capacitance. Although, the delays through one segment of one clock branch do not need to be matched with the delays through another, different segment of that branch or with the segments of another branch.

Deskew circuit 122 adjusts the propagation delay through clock branch 118-2 to match the propagation delay through clock branch 118-1 (the reference branch in this example) based on a sensed phase difference in clock signals passed through return paths 206-1 and 206-2. Deskew circuit 122 includes a skew sensor 220 and programmable delay buffers 222-1 and 222-2. In this example, skew sensor 220 and programmable delay buffers 222-1 and 222-2 are located in close proximity to start location 116.

Programmable delay buffers 222-1 and 222-2 are coupled within branches 118-1 and 118-2, respectively, for matching the propagation delays through each branch based on the sensed phase difference. Programmable delay buffers 222-1 and 222-2 delay both the send and return paths of the respective branch 118-1 and 118-2 equally. Clock source 117 receives the common clock signal, which is buffered by buffer 202 for driving branches 118-1 and 118-2 through programmable delay buffers 222-1 and 222-2. Clock branch 118-1 is used as a reference branch, and the delay through programmable delay buffer 222-2 is adjusted relative to a "fixed" delay through buffer 222-1 such that branches 118-1 and 118-2 have the same delay.

Since clock branch 118-1 is used as a reference branch, programmable delay buffer 118-1 is configured to add a fixed delay into send path 204-1 and return path 206-1. Programmable delay buffer 222-1 includes a SEND_IN input coupled to the output of common clock buffer 202, a SEND_OUT output coupled to send path 204-1, a RETURN_IN input coupled to return path 206-1, a RETURN_OUT output coupled to sense line. CLK_REF_SENSE, a reference clock input REF_IN coupled to ground terminal GND, an adjust ENABLE input coupled to ground terminal GND, an adjust RESET input coupled to ground terminal GND, and an ADJUST control input coupled to ground terminal GND.

Programmable delay buffer 222-2 is configured to add an adjustable delay to send path 204-2 and return path 206-2 and includes a SEND_IN input coupled to the output of common clock buffer 202, a SEND_OUT output coupled to send path 204-2, a RETURN_IN input coupled to return path 206-2, a RETURN_OUT output coupled to sense line CLK_A_SENSE, a reference clock input REF_IN coupled to reference clock line CLK_REF_SENSE, an adjust ENABLE input coupled to adjust enable input 230, an adjust RESET input coupled to reset input 232, and an ADJUST control input coupled to control line ADJUST_A.

Skew sensor 220 includes clock sense inputs CLK_REF and CLK_A for receiving clock sense lines CLK_REF_SENSE and CLK_A_SENSE, respectively, from the ends of return paths 206-1 and 206-2. The deskew operation is performed by sensing the phase relationship between the CLK_A_SENSE and CLK_REF_SENSE signals. Skew sensor 220 generates an adjust control signal on ADJUST_A to decrease or increase the delay through buffer 222-2 and therefore advance or delay the sensed clock signal on CLK_A_SENSE relative to the reference clock signal on CLK_REF_SENSE, based on the sensed phase relationship. In one embodiment, skew sensor 220 detects whether the rising (or alternatively falling) edge arrives first on CLK_REF or CLK_A. If the rising edge arrives first on CLK_REF, skew sensor 220 will set ADJUST_A to decrease the delay through programmable delay buffer 222-2 by an incremental amount. Alternatively, if the rising edge on input CLK_A before a corresponding arising edge arrives on input CLK_REF, skew sensor 220 will set ADJUST_A to increase the delay through programmable delay buffer 222-2.

Adjust enable input 230 is held active for each relevant clock cycle during the deskew operation. Once the phase difference between CLK_REF_SENSE and CLK_A_SENSE is within an acceptable range, adjust enable input 230 can be inactivated to avoid buffer 222-2 from making repetitive adjustments about a balance point. If the phase difference increases to a value outside of the acceptable range due to a change in the operating characteristics of the integrated circuit or some other condition, adjust enable input 230 can be re-activated to remove the undesired skew.

In one embodiment, the delay adjustment happens once per clock cycle during the deskew operation as long as reset input 232 is inactive and adjust enable input 230 is active. However, adjustments can be made at any suitable frequency by selectively activating adjust enable input 230. In one embodiment, adjustments are be made at any integer division of the reference clock frequency. For example, adjust enable input 230 can be active every 2, 3, 4, . . . , N clock cycles, where N is any positing integer. This would allow deskew circuit 122 to be used for deskewing clock signals having very high frequencies, which would otherwise be difficult due to the delay through the send and return clock paths. This would also allow deskew circuit 122 to be used to deskew clock signals from different clock domains having different frequencies as long as the faster clock signals have frequencies that are integer multiples of the slowest clock frequency. In this embodiment, adjust enable input 230 can be activated during each rising (or falling) edge of the slowest clock signal or any subset of these edges.

The deskew operation can be controlled through adjust enable input 230 and reset input 232 by any suitable circuitry, such as a processor, a state machine or combinational logic. Also, the control circuitry can use volatile or non-volatile memory if desired.

FIG. 3 is a schematic diagram illustrating a clock deskew circuit 300 according to an alternative embodiment of the present invention. The same reference numerals are used in FIG. 3 as were used in FIG. 2 for the same or similar elements. In this embodiment, the programmable delay buffer 222-2 is located near end location 120-2, respectively.

For simplicity, endpoint buffer 208-1 is not replaced with programmable delay buffer 222-1 since clock branch 118-1 is configured to provide a fixed, reference delay. However, endpoint buffer 208-1 can be replaced with programmable delay buffer 222-1 or any other buffer in an alternative embodiment.

Skew sensor 220 is still positioned at start location 116 and has its inputs, CLK_REF and CLK_A coupled to the ends of return paths 206-1 and 206-2, respectively. Adjust output ADJUST_A is coupled to the ADJUST input of programmable delay buffer 222-2. Buffer 222-2 has its SEND_IN input coupled to the end of send path 204-2, its SEND_OUT output coupled to send CLK_A_OUT, its RETURN_IN input coupled to SEND_OUT, its RETURN_OUT output coupled to the beginning of return path 206-2, its reference clock input REF_IN coupled to SEND_IN, its ENABLE input coupled to adjust enable input 230, its RESET input coupled to reset input 232, and its ADJUST control input coupled to control line ADJUST_A.

As in the embodiment shown in FIG. 2, skew sensor 220 senses the phase difference between CLK_A_SENSE and CLK_REF_SENSE and adjusts the delay through buffer 222-2 so as to reduce the difference. Once adjusted, the clock signal on CLK_A_OUT at end location 120-2 is substantially aligned in phase with respect to the clock signal on CLK_REF_OUT.

However, the embodiment shown in FIG. 2 may be preferable over the embodiment shown in FIG. 3 for some applications of the present invention. The embodiment shown in FIG. 2 may be able to operate at a higher frequency than the embodiment shown in FIG. 3 since the adjust signal ADJUST_A does not need to be routed all the way to end location 120-2 as in the embodiment shown in FIG. 3. The embodiment shown in FIG. 2 also limits the routing of the enable and reset signals and allows the major elements of the deskew circuits to be placed within a common location on the layout pattern of the integrated circuit which may have advantages in certain embodiments of the present invention. However, the programmable delay buffers can be located at any position along clock branches 118-1 and 118-2 in alternative embodiments of the present invention.

FIG. 4 is a diagram illustrating expansion of the embodiment shown in FIG. 2 to the adjustment of a plurality of clock branches relative to a common reference clock branch, wherein all clock signals reside in the same clock domain. Similar reference numerals are used in FIG. 4 as were used in FIG. 2 for the same or similar elements. However, the suffix "-REF" is used in FIG. 4 to designate the elements of the reference clock branch "118-REF" (118-1 in FIG. 2), while the suffixes "-1" to "-N" are used to designate the elements of adjustable clock branches "118-1" through "118-N", where N is any positive integer.

Clock deskew circuit 260 includes a plurality of skew sensors 220-1 through 220-N, a fixed, reference delay buffer 222-REF and a plurality of programmable delay buffers 222-1 through 222-N, which are located at start location 116. Each adjustable branch 118-1 through 118-N has a respective skew sensor, 220-1 through 220-N, which adjusts the delay through its respective programmable delay buffer, 222-1 through 222-N, based on a sensed phase difference between its return clock signal and that of reference path 118-REF. Each clock branch receives a delayed version of the common clock signal from clock source 117. For simplicity, clock buffer 202 (shown in FIG. 2) is not shown. Once the phase differences have been reduced to an acceptable level, the resulting clock signals CLK_A_OUT[1] through CLK_A_OUT[N] at end locations 120-1 through 120-N are substantially aligned with the reference clock signal on CLK_REF_OUT. As before, each buffer 118-1 through 118-N can be enabled or reset by inputs 230 and 232.

In one embodiment, the clock branch in the clock tree that has the longest propagation delay is used as the reference branch 118-REF. At the beginning of the deskew operation, programmable delay buffers 222-1 through 222-N are reset to a minimum delay, and then progressively increased in delay until the phase differences are reduced sufficiently. Alternatively, any clock branch that has a delay, such as a midpoint delay, that is less than a maximum clock branch delay and greater than a minimum clock branch delay, can be used as the reference branch. In this embodiment, the programmable buffers 222-1 through 222-N can be reset to a delay value, such as a midpoint delay, and then adjusted accordingly, as long as the buffers have a sufficient delay range.

FIG. 5 is a diagram, which illustrates a balanced clock tree 350 according to an alternative embodiment of the present invention in which one or more of the clock branches are in different clock domains. Again, the same reference numerals are used in FIG. 5 as were used in FIG. 4 for the same or similar elements.

The SEND_IN input to each programmable delay buffer 222-REF and 222-1 through 222-N is coupled to a respective clock input CLK[REF] and CLK[1] through CLK[N]. The longest branch having the slowest clock frequency is used as the reference branch. In this example, CLK[REF] has a frequency of 100 MHz, CLK[1] has a frequency of 200 MHz, CLK[2] has a frequency of 400 MHz, and CLK[N] has a frequency of 600 MHz. Multiple clock domains can be aligned with one another at end locations 120-REF and 120-1 through 120-N as long as their frequencies are integer multiples of the slowest clock frequency. By selectively enabling adjust enable input 230 once during each selected cycle of the slowest clock signal (a subset of the cycles of the faster clock signals) adjustments can be made in a synchronous fashion to all clock branches.

FIG. 6 is a diagram, which illustrates the adjustment of a plurality of clock branches in a closed-loop neural network, wherein all clock signals reside in the same clock domain. However, different clock domains can also be used as shown in FIG. 5. Similar reference numerals are used in FIG. 6 as were used in FIG. 4 for the same or similar elements.

In this embodiment, the clock tree includes N+1 clock branches, labeled 118-0 through 118-N Each branch has its own skew sensor 220-0 through 220-N and programmable delay buffer 222-0 through 222-N. The clock signal received at the end of the return path of one clock branch is used as the reference clock for the skew sensor and programmable delay buffer of the next clock branch in the tree. The return clock signal of the last branch in the tree is used as the reference clock for the skew sensor and programmable delay buffer of the first branch in the tree, thereby closing the loop. Thus, the phase of each return clock is compared to the phase of another return clock in a serial fashion such that all return clocks are aligned with one another.

FIG. 7 is a schematic diagram of one of the skew sensors 220 according to one embodiment of the present invention. Sensor 220 is configured to form a latch for determining whether the transition arrives first on CLK_A or CLK_REF and sets ADJUST_A to a logic high level or a logic low level. Circuit 220 includes input buffers 401 and 402, output inverters 403 and 404 and cross-coupled logic NAND gates 405 and 406. NAND gate 405 has a first input coupled to the output of buffer 401, a second input coupled to the output of NAND gate 406 and an output coupled to the input of inverter 403. NAND gate 406 has a first input coupled to the output of buffer 402, a second input coupled to the output NAND gate 405 and an output coupled to the input of inverter 404.

If CLK_A transitions from low to high before CLK_REF, ADJUST_A will go high. If CLK_REF transitions to the high state before CLK_A, ADJUST_A will go low. These output signals can then be used to control whether the corresponding programmable delay buffer(s) should increase of decrease their propagation delays.

FIG. 8 is a schematic diagram illustrating a skew sensor 410 according to an alternative embodiment of the present invention. Skew sensor 410 includes a plurality of inverters 411–416, which are coupled in series with one another and receive clock input CLK_A for generating outputs A1–A6. Skew sensor 410 further includes inverters 417–422, which are coupled with series with one another and receive clock input CLK_REF for generating outputs B1–B6, respectively. Output A6 from inverter 416 is coupled to the input of pass gate 430, which is controlled by outputs B5 and B6. The output of pass gate 430 is coupled to the input of keeper cell 432, which is formed by inverters 433 and 434. An N-channel pull-down transistor 436 selectively couples the input of keeper cell 432 to ground, and is controlled by the output of OR gate 438. The inputs of OR gate 438 are coupled to A1 and B1. The output of keeper cell 432 is coupled to the input of inverter 440 and the input for generating output ADJUST_A.

Keeper cell 432 maintains the previously received signal as long as no new signal is applied to the keeper cell. As long as one of the outputs A1 or B1 is high, the output of OR gate 438 will turn on pull-down transistor 436, thereby holding the input to keeper cell 432 low. It is only when both inputs CLK_A and CLK_REF go high that pull-down transistor 436 turns off, which allows the output of pass gate 430 to be applied to keeper cell 432. If CLK_A transitions before CLK_REF, the transition on CLK_A will pass through pass gate 430 before the transition on CLK_REF causes the pass gate to close through outputs B5 and B6. In this case, keeper cell 432 will store a logic low value on KEEPER_OUT, resulting in ADJUST_A going high. Otherwise, the input of keeper cell 432 remains low, resulting in ADJUST_A being held low.

Other skew sensor circuits can also be used in alternative embodiments of the present invention. The embodiments shown in FIGS. 7 and 8 are provided as examples only.

FIG. 9 is a schematic diagram illustrating one of the programmable delay buffers 222 according to one embodiment of the present invention. Programmable delay buffer 222 includes logic AND gate 502, up/down counter 504, and 8-to-1 delay multiplexers 506 and 508.

The SEND_IN input is coupled to the CLK_IN input of multiplexer 506. The CLK_OUT output of multiplexer 506 is coupled to the SEND_OUT output of buffer 222. In the reverse direction, RETURN_IN is coupled to the CLK_IN input of multiplexer 508. The CLK_OUT output of multiplexer 508 is coupled to the RETURN_OUT output of buffer 222. The delays through multiplexers 506 and 508 are controlled by up/down counter 504 as a function of the ADJUST, REF_IN, ENABLE and RESET inputs to the buffer.

The RESET input is coupled to the count RESET input of up/down counter 504 for resetting the count on outputs C0, C1 and C2 to a predetermined default value, such as a minimum count or a midpoint count, when RESET is active. The reference clock input REF_IN is coupled to the clock input CLK of counter 504, and is gated by the ENABLE input through AND gate 502. Thus, counter 504 increments or decrements the count on outputs C0–C2 on each cycle of the REF_IN clock only if ENABLE is active. The ADJUST input is coupled to the ADD/SUB control input of counter 504, which controls whether the counter increments or decrements the count. For example, if ADJUST is high, counter 504 increments the count at the next rising edge of the clock input CLK. If the ADJUST is low, counter 504 decrements the count.

Counter outputs C0–C2 are coupled to the select inputs C0–C2, respectively, of multiplexers 506 and 508 for selecting a corresponding propagation delay through the multiplexers. In one embodiment, each multiplexer 506 and 508 has eight different paths from CLK_IN to CLK_OUT, with each path having a different propagation delay. The particular path can be selected through select inputs C0–C2 as a function of the count provided by counter 504. Thus, the clock signal received on SEND_IN from the send path of the respective clock branch can be delayed through multiplexer 506, and this delay can be programmed by up/down counter 504.

In order for the clock return path of the respective clock branch to have the same delay as the send path, programmable delay buffer 222 further includes the second multiplexer 508 within the return path. The select inputs C0–C2 of multiplexer 516 are driven by the same count as select inputs C0–C2 of multiplexer 506 and therefore select the same propagation delay from CLK_IN to CLK_OUT. Thus, the path from RETURN_IN to RETURN_OUT has the same delay as the path from SEND_IN to SEND_OUT.

In alternative embodiments, up/down counter 504 and multiplexers 506 and 508 can have any size or number of bits to provide a desired adjustment resolution or speed. In addition, the amount of delay provided by each path through the multiplexers can be varied in alternative embodiments.

FIG. 10 is a schematic diagram illustrating up/down counter 504 in greater detail according to one embodiment of the present invention. Counter 504 includes flip-flops 510–513, full add/subtract circuit 514, divider 515 and inverter 516. Flip-flop 510 latches and ADD/SUB input of counter 504 on each rising edge of the clock signal produced at the output of divider 515. Flip-flop 510 has a reset input coupled to the reset input of counter 504. The "Q" output of flip-flop 510 is coupled to the ADDSUB control input of ADD/SUBTRACT circuit 514. The state of ADDSUB determines whether circuit 514 adds or subtracts a predetermined amount, such as one unit, from the value on operand inputs C0–C2 to produce the result on outputs COUT0–COUT2. The result on outputs COUT0–COUT2 is latched by flip-flops 511–513, respectively, at the rising edge of the clock signal produced at the output of inverter 516. The latched values are applied to counter outputs C0–C2 and fed back to operand inputs C0–C2 of circuit 514 to form the counter.

Flip-flops 511–513 have reset inputs coupled to the reset input of counter 504. Thus, when the reset input to the counter is active, the values on counter outputs C0–C2 (and the operand inputs of circuit 514 are reset to a minimum value of zero (in this embodiment).

Divider 515 divides the input reference clock by an integer factor or divisor, such as 1, 2, 3, 4, . . . N, which allows the counter 504 to be updated on only selected cycles of the reference frequency. The divisor in one branch can be different than the divisor in another branch. This can be useful when the frequency of one branch is an integer multiple of the frequency of another branch or of the reference clock, for example.

FIG. 11 is a schematic diagram illustrating one of the delay multiplexers 506 and 508 shown in FIG. 9. Each delay multiplexer includes a three-to-eight decode circuit 520 and an adjustable delay line 522. Three-to-eight decode circuit 520 receives the select inputs C0–C2 corresponding to the current count in counter 504 (shown in FIG. 9).

Decode circuit 520 sets one of the outputs A0–A7 to a logic high level and resets the other outputs to a logic low level depending on the count. Adjustable delay line 522 includes a plurality of buffers 523–530, which are connected in series with one another such that the outputs of each buffer provide a clock signal, which is progressively delayed with respect to the signal received on CLK_IN. Each output of buffers 523–531 is selectively coupled to CLK_OUT through a respective switch A0–A7. Depending on which output A0–A7 from decode circuit 520 is set to a higher level, the corresponding switch A0–A7 will be closed and the other switches will be opened. Table 1 is a decode table for decoder 520:

TABLE 1

| C0 | C1 | C2 | A [i] |
|----|----|----|-------|
| 0  | 0  | 0  | 0     |
| 1  | 0  | 0  | 1     |
| 0  | 1  | 0  | 2     |
| 1  | 1  | 0  | 3     |
| 0  | 0  | 1  | 4     |
| 1  | 0  | 1  | 5     |
| 0  | 1  | 1  | 6     |
| 1  | 1  | 1  | 7     |

In this embodiment, when counter 504 is reset to zero, switch A0 is closed, providing the smallest delay through the multiplexer. However, Table 1 can be modified in alternative embodiments so that when counter 504 is reset to an initial count at the beginning of the deskew process, a different switch is closed. The propagation delay can then be increased or decreased with the count. Again, the amount of delay provided by each path through the multiplexer can be varied in alternative embodiments. Also, other adjustable delay circuits can be used in replace of the delay line shown in FIG. 11. For example, a buffer circuit can be used, which has multiple output drivers with different drive strengths. The appropriate driver or drivers can be selected to provide the appropriate output delay. Other circuits can also be used.

With the above-embodiments, clock or other signal trees on an integrated circuit can be easily balanced on a global level to remove skew between the signals. Since it may not be efficient to deskew all clock end points at a global level, the clock deskew circuit of the present invention can be used at the global level for synchronizing a selected number of clock end points. This deskew operation can then be repeated at a local level with any deskew methodology or circuit.

The clock deskew circuit is capable of deskewing the clock signals at their endpoints, independent of their locations on the chip. The circuit is not limited by routing length on the chip. The clock deskew circuit is easy to route with automated routing tools. The deskew circuit also uses less power during the deskew operation and during normal chip operation as compared to typical deskew circuits. Insertion delay caused by insertion of the deskew circuit can be easily removed by using a PLL after the deskew operation, as shown in FIG. 1. The circuit can be used at various clock tree levels and with various endpoint drivers on the chip. The circuit can be applied to one, two or more small or large blocks of logic.

Although the present invention has been described with reference to preferred embodiments, workers skilled in the art will recognize that changes may be made in form and detail without departing from the spirit and scope of the invention.

What is claimed is:

1. A signal deskew circuit, comprising:
   first and second signal branches, each extending between a start location and a respective end location and having a send path and a return path that have substantially the same propagation delays;
   a first adjustable delay coupled in the send and return paths of the first signal branch and having a delay, which is adjustable based on a respective adjust signal;
   a first skew sensor coupled to the return paths of the first and second signal branches, which generates the respective adjust signal for the first adjustable delay based on a phase difference between signals on the return paths of the first and second signal branches; and
   a phase-locked loop having a reference input, a feedback input coupled to the send path of one of the first and second signal branches at the end location, and an output coupled to the send path at the start location of that signal branch.

2. The signal deskew circuit of claim 1 wherein the delay through the first adjustable delay is the same for the send path and the return path of the first signal branch.

3. The signal deskew circuit of claim 2 wherein the first adjustable delay comprises:
   an up/down counter having a clock input, an up/down control input coupled to the respective adjust signal, and a count output representing a delay setting.

4. The signal deskew circuit of claim 3 wherein the first adjustable delay further comprises:
   a first delay multiplexer coupled in series with the send path and having a plurality of paths, which have different propagation delays and are selectable as a function of the count output; and
   a second delay multiplexer coupled in series with the return path and having a plurality of paths, which have propagation delays that are matched to the delays through the first delay multiplexer and are selectable as a function of the count output.

5. The signal deskew circuit of claim 4 wherein the first and second delay multiplexers each comprises:
   a delay line formed of a plurality of buffers selectively coupled in series with one another as a function of the count output.

6. The signal deskew circuit of claim 1 and further comprising:
   a plurality of signal branches, including the first and second signal branches;
   a plurality of adjustable delays, including the first adjustable delay, which are coupled in the send and return paths of respective ones of the signal branches and each having a delay, which is adjustable based on a respective adjust signal; and
   a plurality of skew sensors, including the first skew sensor, which are coupled to the return paths of respective pairs of the signal branches, wherein each skew sensor generates a respective adjust signal for a respective one of the adjustable delays based on a phase difference between signals on the return paths of the respective pair of signal branches.

7. The signal deskew circuit of claim 6 wherein one of the signal branches is a reference branch and wherein each respective pair of the signal branches includes the reference branch such that each skew sensor generates the respective adjust signal based on a phase difference between signals on the return path of the reference branch and the return path of the other signal branch in the pair.

8. The signal deskew circuit of claim 7 wherein the reference branch comprises a fixed, reference delay in the send and return paths of that branch.

9. The signal deskew circuit of claim 6 wherein the plurality of signal branches comprises N+1 signal branches, identified as branch 0 to branch N, where N is a positive integer variable and wherein the skew sensors are coupled to the return paths in the following signal branch pair combinations: branch 0 and branch 1, branch 1 and branch 2, . . . , branch N−1 and branch N, and branch N and branch 0, respectively.

10. The signal deskew circuit of claim 1 wherein:
the start location and each end location are different local areas on an integrated circuit; and
the first skew sensor and the first adjustable delay are located at the start location.

11. The signal deskew circuit of claim 1 wherein:
the start location and each end location are located in different local areas on an integrated circuit;
the first skew sensor is located at the start location; and
the first adjustable delay is located at the end location of the first signal branch.

12. The signal deskew circuit of claim 1 wherein the first adjustable delay comprises an adjust enable input.

13. The signal deskew circuit of claim 12 and further comprising:
a signal source coupled to the send paths of the first and second signal branches at the start location, which provides a clock signal having a plurality of clock cycles at a clock frequency, wherein the adjust enable input is enabled during a subset of the clock cycles.

14. The signal deskew circuit of claim 12 and further comprising:
a first signal source coupled to the send path of the first signal branch at the start location, which provides a first clock signal having a first clock frequency; and
a second signal source coupled to the send path of the second signal branch at the start location, which provides a second clock signal having a second clock frequency, wherein the first clock frequency is an integer multiple of the second frequency, and wherein the adjust enable input is enabled at a frequency no greater than the second frequency.

15. The signal deskew circuit of claim 1 wherein the send path and return path in each signal branch are divided into matched segments by matched signal buffer pairs such that each segment in the send path has a propagation delay that is substantially the same as a corresponding segment in the return path.

16. A method of adjusting phase differences on an integrated circuit, the method comprising:
passing periodic signals along a plurality of signal branches, which extend between a start location and respective end locations on the integrated circuit and have a send path and a return path that have substantially the same propagation delays;
sensing a phase difference between the periodic signals along the return paths of a first and a second of the signal branches;
adjusting a propagation delay along the send path and a propagation delay along the return path of the first signal branch based on the phase difference;
receiving a reference periodic signal;
driving a source periodic signal onto the send paths of the plurality of signal branches from the start location to form the plurality of periodic signals; and
adjusting a phase of the source periodic signal such that phases of at least one of the periodic signals at the respective end location aligns with a phase of the reference periodic signal.

17. The method of claim 16 wherein the propagation delays along the send and return paths of the first signal branch are adjusted substantially equally.

18. The method of claim 16 wherein receiving a reference periodic signal comprises receiving a clock signal generated externally from the integrated circuit.

19. A signal deskew circuit, comprising:
first and second signal branches, each extending between a common start location and a respective end location and having a send path and a return path that have substantially the same propagation delays;
adjustable delay in the send and return paths of the first signal branch, which is adjustable based on an adjust signal;
a skew sensor, which generates the adjust signal based on a phase difference between signals on the return paths of the first and second signal branches; and
means for aligning a phase of a signal at the end location of at least one of the first and second signal branches with a phase of an external clock signal.

* * * * *